US 12,066,357 B1

(12) United States Patent
Kraft

(10) Patent No.: US 12,066,357 B1
(45) Date of Patent: Aug. 20, 2024

(54) SYSTEMS AND METHODS FOR DETERMINING DUCT LEAKAGE IN A CLIMATE CONTROL SYSTEM

(71) Applicant: Trane International Inc., Davidson, NC (US)

(72) Inventor: Wayne N. Kraft, Tyler, TX (US)

(73) Assignee: Trane International Inc., Davidson, NC (US)

( * ) Notice: Subject to any disclaimer, the term of this patent is extended or adjusted under 35 U.S.C. 154(b) by 4 days.

(21) Appl. No.: 18/047,206

(22) Filed: Oct. 17, 2022

Related U.S. Application Data

(63) Continuation of application No. 16/791,910, filed on Feb. 14, 2020, now Pat. No. 11,506,563.

(51) Int. Cl.
*G01M 3/28* (2006.01)
*F24F 11/32* (2018.01)

(52) U.S. Cl.
CPC ........... *G01M 3/2807* (2013.01); *F24F 11/32* (2018.01)

(58) Field of Classification Search
CPC ............................. G01M 3/2807; F24F 11/32
See application file for complete search history.

(56) References Cited

U.S. PATENT DOCUMENTS

| | | | | |
|---|---|---|---|---|
| 5,192,343 | A * | 3/1993 | Henry | B01D 46/62 96/402 |
| 6,099,609 | A * | 8/2000 | Lira | F04D 29/281 55/467 |
| 7,516,649 | B2 | 4/2009 | Locke et al. | |
| 9,188,508 | B1 * | 11/2015 | Meyer | G01M 99/005 |
| 10,425,029 | B1 * | 9/2019 | Beifus | F04D 27/004 |
| 10,184,678 | B2 | 10/2019 | Lee | |
| 2011/0179854 | A1 | 7/2011 | Brooks | |
| 2014/0260552 | A1 | 9/2014 | Morris et al. | |
| 2015/0338314 | A1 | 11/2015 | Meyer | |
| 2017/0138814 | A1 | 5/2017 | Dempsey et al. | |
| 2019/0025154 | A1 | 1/2019 | Johnson | |

* cited by examiner

*Primary Examiner* — Mohamed Charioui
*Assistant Examiner* — Xiuqin Sun
(74) *Attorney, Agent, or Firm* — WOMBLE BOND DICKINSON (US) LLP

(57) ABSTRACT

Methods and related systems for operating a climate control system for an indoor space are disclosed. In an embodiment, the method includes operating an indoor fan of the climate control system to rotate an impeller of the indoor fan in a reverse rotational direction opposite a nominal rotational direction of the impeller. Additionally, the method includes determining an airflow of the indoor fan when the impeller of the indoor fan is rotated in the reverse rotational direction. Further, the method includes determining a duct leakage rate associated with at least one duct of the climate control system based on the determined airflow, wherein the at least one duct is sealed-off at an end thereof.

20 Claims, 3 Drawing Sheets

SYSTEMS AND METHODS FOR DETERMINING DUCT LEAKAGE IN A CLIMATE CONTROL SYSTEM

CROSS-REFERENCE TO RELATED APPLICATIONS

This present application is a continuation of U.S. patent application Ser. No. 16/791,910, which was filed Feb. 14, 2020, and entitled "SYSTEMS AND METHODS FOR DETERMINING DUCT LEAKAGE IN A CLIMATE CONTROL SYSTEM", and which is herby incorporated by reference in its entirety.

STATEMENT REGARDING FEDERALLY SPONSORED RESEARCH OR DEVELOPMENT

Not applicable.

BACKGROUND

Climate control systems, such as heating, ventilation, and/or air conditioning (HVAC) systems may generally be used in residential and/or commercial areas for heating and/or cooling an indoor space to create comfortable temperatures inside those areas. Some climate control systems may be split-type air conditioning or heat pump systems. These systems typically have an indoor unit and an outdoor unit which are capable of cooling a comfort zone by operating in a cooling mode for transferring heat from a comfort zone to an ambient zone using a refrigeration cycle. Heat pump systems are also generally capable of reversing the direction of refrigerant flow through the components of the climate control system so that heat is transferred from the ambient zone to the comfort zone, thereby heating the comfort zone.

In some applications, the indoor unit of a climate control system for an indoor space may include an indoor fan for providing airflow through the indoor unit along an air circulation path of the climate control system. In some applications, the air circulation path of the climate control system may be defined by one more supply ducts and one or more return ducts extending between the indoor unit and the indoor space. If a portion of the airflow in the at least one duct of the climate control system leaks from said duct prior to being supplied to the indoor space and/or being returned to the indoor unit, the performance of the climate control system is reduced.

BRIEF SUMMARY

Some embodiments disclosed herein are directed to a method of operating a climate control system for an indoor space. In an embodiment, the method includes operating an indoor fan of the climate control system to rotate an impeller of the indoor fan in a reverse rotational direction opposite a nominal rotational direction of the impeller. Additionally, the method includes determining an airflow of the indoor fan when the impeller of the indoor fan is rotated in the reverse rotational direction. Further, the method includes determining a duct leakage rate associated with at least one duct of the climate control system based on the determined airflow, wherein airflow through the at least one duct is restricted.

Other embodiments disclosed herein are directed to a climate control system for an indoor space. In an embodiment, the climate control system includes an indoor fan configured to produce an airflow through the indoor space, and at least one duct defining an air circulation path of the indoor space, wherein airflow through the at least one duct is restricted. In addition, the climate control system includes a controller to be coupled to the indoor fan. The controller is configured to operate the indoor fan to rotate an impeller of the indoor fan in a reverse rotational direction opposite a nominal rotational direction of the impeller. In addition, the controller is configured to determine an airflow of the indoor fan when the impeller of the indoor fan is rotated in the reverse rotational direction. Further, the controller is configured to determine a duct leakage rate associated with the at least one duct based on the airflow of the indoor fan.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
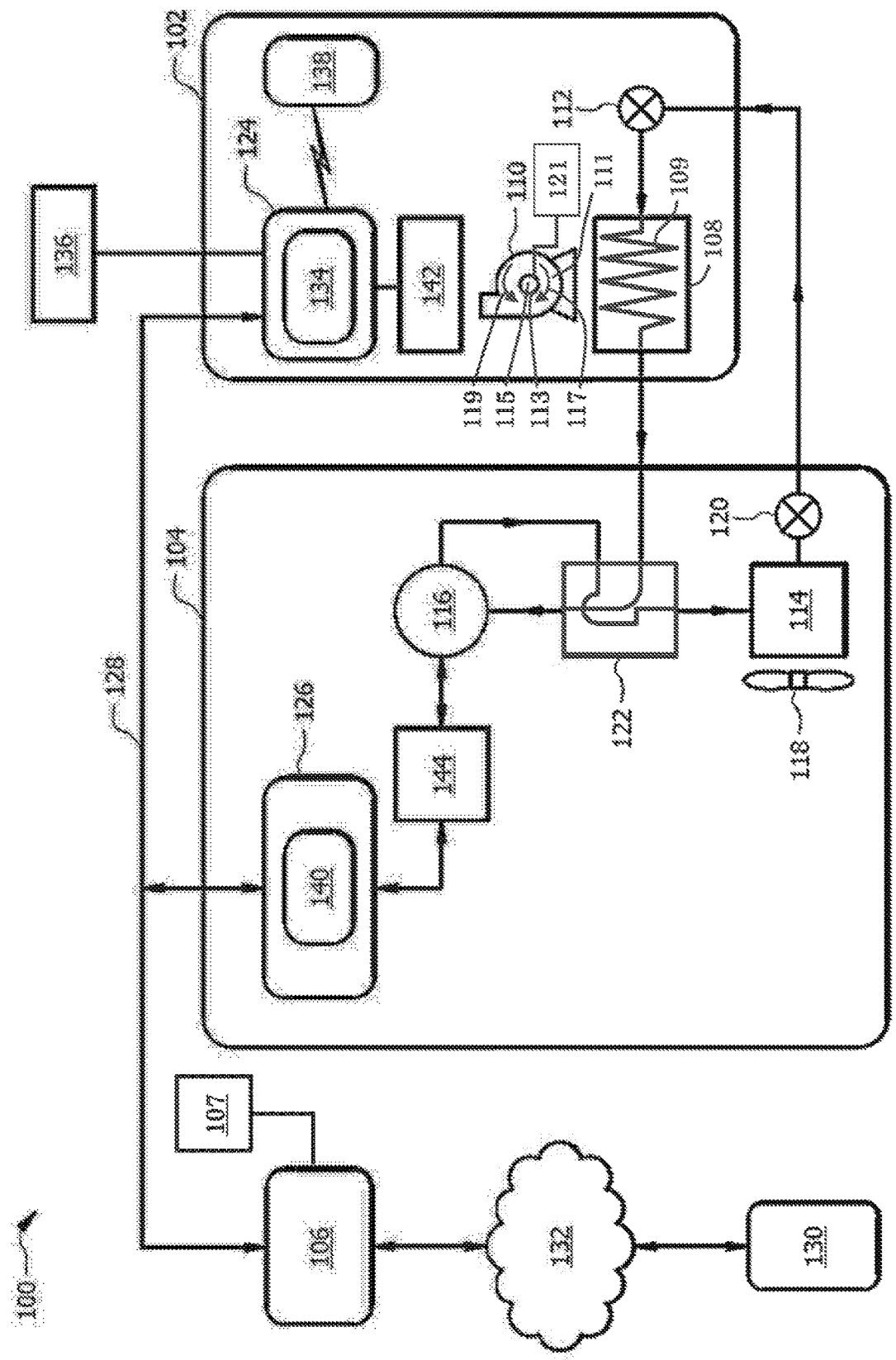
FIG. 1 is a diagram of a HVAC system configured for operating in a cooling mode according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

As described above, an indoor unit of a climate control system for an indoor space may include an indoor fan for providing airflow through an indoor unit of the climate control system. Additionally, the indoor fan may provide airflow along an air circulation path defined by at least one duct of the climate control system that extends between the indoor unit and the indoor space. If not properly installed or maintained, airflow in the at least one duct of the climate control system may leak from the at least one duct prior to being supplied to the indoor space and/or being returned to the indoor unit. For instance, airflow in a supply duct of the climate control system may leak from the supply duct before being supplied to the indoor space, and/or at least some of the airflow in a return duct of the climate control system may leak from the return duct before being returned to the indoor unit.

The amount or rate of leakage in the duct(s) of the climate control system may be evaluated or monitored to determine if the leakage rate is above a predetermined maximum permissible leakage rate. For instance, the maximum permissible leakage rate may be a leakage rate greater than a leakage rate to be expected in a newly and properly installed climate control system in typical applications. In some conventional climate control systems for indoor spaces, specialized equipment is utilized to determine the amount of airflow leakage in the duct(s) of the climate control system. For instance, a specialized fan provided by a third party and having an airflow sensor may be attached to a register defining an interface between one of the ducts and the indoor space while the remaining ducts of the climate control system are sealed by the third party so that the fan may pressurize the ducts of the climate control system and determine the amount of airflow that may be produced in the sealed ducts, where the amount of produced airflow corresponds to the amount of leakage in the sealed ducts.

However, the utilization of specialized equipment provided by third parties for determining duct leakage may increase the cost, complexity, and time required for determining duct leakage in the climate control system. Additionally, utilizing a fan located externally of the indoor unit (e.g., a fan attached to a register positioned at an end of one of the duct(s) of the climate control system) may allow only for the determination of leakage in all of the ducts of the climate control system. In other words, utilizing an external fan may not allow for the supply ducts and return ducts of the climate control system to be evaluated independently of each other to determine if the leak (if present) stems from either the supply or return ducts.

For example, if the external fan is attached to a supply duct, then, upon activation, the external fan will produce a positive airflow into and through both the supply duct and return duct (the return duct being positioned downstream from the supply duct relative to the external fan in this arrangement) given that the indoor fan (being positioned between the supply and return ducts) of the climate control system is typically incapable of sealing the supply duct from the return duct (and vice-a-versa). Given that the airflow produced by the external fan flows both into and through the supply duct and return duct, any leak formed in either the supply duct or return duct will contribute to the leakage rate determined by the external fan.

Accordingly, embodiments disclosed herein include systems and methods for determining duct leakage in a climate control system that utilizes the indoor fan of the climate control system and thus does not rely on specialized equipment provided by a third party. Particularly, embodiments disclosed herein include systems and methods for determining duct leakage in the climate control system that includes operating an indoor fan of the climate control system to rotate an impeller of the indoor fan in a reverse rotational direction opposite a nominal rotational direction of the impeller whereby a fan efficiency of the indoor fan is reduced, determining an airflow of the indoor fan when the impeller of the indoor fan is rotated in the reverse rotational direction, and determining a duct leakage rate associated with the at least one duct based on the airflow of the indoor fan, wherein airflow through the at least one duct is restricted.

As will be described in more detail below, use of the embodiments disclosed herein may allow duct leakage to be continually monitored over the operational life of the climate control system such that any issues or problems related to excessive duct leakage that may interfere with the performance of the climate control system may be timely addressed. Moreover, by utilizing the indoor fan of the climate control system to determine duct leakage allows a user to determine leakage in the supply duct and return ducts independently to thereby identify the location of the leak (assuming only one of either the supply duct or return duct is leaking). For instance, as will be discussed further herein, by activating the indoor fan (positioned between the supply and return ducts) the indoor fan may isolate the supply duct from the return duct so that, for example, a leak within the return duct does not contribute to the leakage rate of the determined supply duct leakage rate.

Referring now to FIG. 1, a schematic diagram of a climate control system 100 according to some embodiments is shown. In this embodiment, climate control system 100 is a HVAC system, and thus, system 100 may be referred to herein as HVAC system 100. In the illustrated embodiment, HVAC system 100 comprises a heat pump system that may be selectively operated to implement one or more substantially closed thermodynamic refrigeration cycles to provide a cooling functionality (hereinafter "cooling mode"), and/or a heating functionality (hereinafter "heating mode"). In other embodiments, the HVAC system 100 is an air conditioner that may only provide cooling through use of the refrigeration cycle. The HVAC system 100, configured as a heat pump system, may comprise an indoor unit 102, an outdoor unit 104, and a system controller 106 that may generally control operation of the indoor unit 102 and/or the outdoor unit 104. In some embodiments, HVAC system 100 may instead comprise a packaged HVAC system that includes the function of the indoor unit 102 in a package located outdoors.

Indoor unit 102 generally includes an indoor heat exchanger 108, an indoor fan 110, an indoor metering device 112, and an indoor controller 124. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. Specifically, indoor heat exchanger 108 may include a coil 109 for channeling the refrigerant therethrough that segregates the refrigerant from any air flowing through indoor heat exchanger 108 during operations. In some embodiments, the indoor heat exchanger 108 may comprise a plate-fin heat exchanger. However, in other embodiments, indoor heat exchanger 108 may comprise a microchannel heat exchanger and/or any other suitable type of heat exchanger.

The indoor fan 110 may generally comprise a centrifugal blower comprising a blower housing 111, a blower impeller 113 at least partially disposed within the blower housing 111, and a blower or indoor fan motor 115 configured to selectively rotate the blower impeller 113 in a rotational first or nominal direction 117 about an axis of rotation of the blower impeller 113. As will be discussed further herein, indoor fan motor 115 may also be configured to rotate blower impeller 113 in a rotational second or reverse direction 119 about the axis of rotation of blower impeller 113 which is opposite the nominal direction 117. Indoor fan 110, comprising a centrifugal blower in this embodiment, is configured to provide or produce an airflow extending into an inlet of indoor fan 110 in an inlet direction along the axis of rotation of indoor fan 110, and out of an outlet of the indoor fan 110 in an outlet direction extending perpendicularly away from the axis of rotation of indoor fan 110. Thus, irrespective of whether impeller 113 of indoor fan 110 is rotated in either the nominal direction 117 or reverse direction 119, indoor fan 110 produces an airflow extending along the inlet direction (extending along the axis of rotation of impeller 113) and outlet direction (extending perpendicularly away from the axis of rotation of impeller 113). The indoor fan 110 may generally be configured to provide airflow through the indoor unit 102 and/or the indoor heat exchanger 108 (specifically across or over the coil 109) to promote heat transfer between the airflow and a refrigerant flowing through the coil 109 of the indoor heat exchanger 108. The indoor fan 110 may also be operated to rotate impeller 113 in the nominal direction 117 as part of delivering temperature-conditioned air from the indoor unit 102 to one or more areas and/or zones of an indoor space. For instance, indoor fan 110 may rotate impeller 113 in the nominal direction 117 as part of satisfying a request for cooling (when HVAC system 100 is in the cooling mode) or a request for heating (when HVAC system 100 is in the heating mode) as determined by system controller 106 of HVAC system 100. The indoor fan 110 may generally be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110.

The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, a reversing valve 122, and an outdoor controller 126. In some embodiments, the outdoor unit 104 may also comprise a plurality of temperature sensors for measuring the temperature of the outdoor heat exchanger 114, the compressor 116, and/or the outdoor ambient temperature. The outdoor heat exchanger 114 may generally be configured to promote heat transfer between a refrigerant carried within internal passages of the outdoor heat exchanger 114 and an airflow that contacts the outdoor heat exchanger 114 but that is segregated from the refrigerant. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger. While not specifically shown, it should be appreciated that outdoor heat exchanger 114 may include a coil similar to coil 109 previously described above for indoor heat exchanger 108.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In some embodiments, however, the compressor 116 may comprise a modulating compressor that is capable of operation over a plurality of speed ranges, a reciprocating-type compressor, a single speed compressor, and/or any other suitable refrigerant compressor and/or refrigerant pump. In some embodiments, the compressor 116 may be controlled by a compressor drive controller 144, also referred to as a compressor drive and/or a compressor drive system.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the outdoor heat exchanger 114. The outdoor fan 118 may generally be configured as a modulating and/or variable speed fan capable of being operated at a plurality of speeds over a plurality of speed ranges. In other embodiments, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. Further, in other embodiments, the outdoor fan 118 may comprise a mixed-flow fan, a centrifugal blower, and/or any other suitable type of fan and/or blower.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flow path of refrigerant through the reversing valve 122 and consequently the HVAC system 100. Additionally, the reversing valve 122 may also be selectively controlled by the system controller 106 and/or an outdoor controller 126.

The system controller 106 may generally be configured to communicate with an indoor controller 124 of the indoor unit 102, an outdoor controller 126 of the outdoor unit 104, and/or other components of the HVAC system 100. In some embodiments, the system controller 106 may be configured to control operation of the indoor unit 102 and/or the outdoor unit 104. In some embodiments, the system controller 106 may be configured to monitor and/or communicate, directly or indirectly, with a plurality of sensors associated with components of the indoor unit 102, the outdoor unit 104, etc. The sensors may measure or detect a variety of parameters, such as, for example, pressure, temperature, and flow rate of the refrigerant as well as pressure and temperature of other components or fluids of or associated with HVAC system 100. In some embodiments, the HVAC system 100 may include a sensor (or plurality of sensors) for sensing or detecting the ambient outdoor temperature. Additionally, in some embodiments, the system controller 106 may comprise a temperature sensor and/or may further be configured to control heating and/or cooling of zones associated with the HVAC system 100 (e.g., within the indoor space). In some embodiments, the system controller 106 may be configured as a thermostat, having a temperature sensor and a user interface, for controlling the supply of conditioned air to zones associated within the HVAC system 100.

The system controller 106 may be in communication with an input/output (I/O) unit 107 (e.g., a graphical user interface, a touchscreen interface, or the like), which may be combined with or remote from the system controller 106, for displaying information and for receiving user inputs. The I/O unit 107 may display information related to the operation of the HVAC system 100 (e.g., from system controller 106) and may receive user inputs related to operation of the HVAC system 100. During operations, the I/O unit 107 may communicate received user inputs to the system controller 106, which may then execute control of HVAC system 100 accordingly. Communication between the I/O unit 107 and system controller 106 may be wired, wireless, or a combination thereof. In some embodiments, the I/O unit 107 may further be operable to display information and receive user inputs tangentially and/or unrelated to operation of the HVAC system 100. In some embodiments, however, the I/O unit 107 may not comprise a display and may derive all information from inputs from remote sensors and remote configuration tools (e.g., remote computers, servers, smartphones, tablets, etc.). In some embodiments, system controller 106 may receive user inputs from remote configuration tools, and may further communicate information relating to HVAC system 100 to I/O unit 107. In these embodiments, system controller 106 may or may not also receive user inputs via I/O unit 107.

In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or any other device 130 via a communication network 132. In some embodiments, the communication network 132 may comprise a telephone network, and the other device 130 may comprise a telephone, smartphone, laptop, tablet computer, and other portable computing/telecommunication devices. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the indoor unit 102 and may generally be configured to receive information inputs, transmit information outputs, and/or otherwise communicate with the system controller 106, the outdoor controller 126, and/or any other device 130 via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110 when the impeller 113 of indoor fan 110 is rotated in either the nominal direction 117 or reverse direction 119, transmit a control output to an electric heat relay, control the rotational direction of the impeller 113 of indoor fan 110, transmit information regarding an indoor fan 110 volumetric flow-rate, communicate with and/or otherwise affect control over an air cleaner 136, and communicate with an indoor EEV controller 138. In some embodiments, the indoor controller 124 and/or the system controller 106 may be configured to communicate with an indoor fan controller 142 in signal communication with the indoor fan motor 115 of indoor fan 110 and/or otherwise affect control over operation of indoor fan motor 115. For example, a sensor package 121 (shown schematically in FIG. 1) in signal communication with indoor fan controller 142 may measure speed and torque of indoor fan motor 115 (when impeller 113 is rotated in either the reverse or nominal rotational directions 119, 117, respectively) and communicate the measured speed and torque of indoor fan motor 115 to indoor controller 124 and/or system controller 106. Sensor package 121 may include a sensor for measuring rotational speed of an output shaft of indoor fan motor 115 coupled to impeller 113, and a sensor for measuring torque outputted by the output shaft of fan motor 115; however, in other embodiments, sensor package 121 may infer the speed and torque of indoor fan motor 115 through other measured parameters. In some embodiments, the indoor personality module 134 may comprise information related to the identification and/or operation of the indoor unit 102 and/or a position of the outdoor metering device 120.

The indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and/or otherwise communicate with the system controller 106, the indoor controller 124, and/or any other device 130 via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

System controller 106, indoor controller 124, outdoor controller 126, compressor drive controller 144, indoor fan controller 142, and indoor EEV controller 138 may each comprise any suitable device or assembly which is capable of receiving electrical (or other data) signals and transmitting electrical (or other data) signals to other devices. In particular, while not specifically shown, controllers 106, 124, 126, 138, 142, and 144 may each include a processor and a memory. The processors (e.g., microprocessor, central processing unit, or collection of such processor devices, etc.) may execute machine readable instructions (e.g., non-transitory machine readable medium) provided on the corresponding memory to provide the processor with all of the functionality described herein. The memory of each controller 106, 124, 126, 138, 142, and 144 may comprise volatile storage (e.g., random access memory), non-volatile storage (e.g., flash storage, read only memory, etc.), or combinations of both volatile and non-volatile storage. Data consumed or produced by the machine readable instructions can also be stored on the memory of controllers 106, 124, 126, 138, 142, and 144.

During operation, system controller 106 may generally control the operation of HVAC system 100 through the indoor controller 124, outdoor controller 126, compressor drive controller 144, indoor fan controller 142, and indoor EEV controller 138 (e.g., via communication bus 128). In the description below, specific control methods are described (e.g., method 300). It should be understood that the features of these described methods may be performed (e.g., wholly or partially) by system controller 106, and/or by one or more of controllers 124, 126, 138, 142, and 144 as directed by system controller 106. As a result, the controller or controllers of HVAC system 100 (e.g., controllers 106, 124, 126, 138, 142, and 144, etc.) may include and execute machine-readable instructions (e.g., non-volatile machine readable instructions) for performing the operations and methods described in more detail below. In some embodiments, each of the controllers 106, 124, 126, 138, 142, and 144 may be embodied in a singular control unit, or may be dispersed throughout the individual controllers 106, 124, 126, 138, 142, and 144 as described above.

As shown in FIG. 1, the HVAC system 100 is configured for operating in a so-called cooling mode in which heat may generally be absorbed by refrigerant at the indoor heat exchanger 108 and rejected from the refrigerant at the outdoor heat exchanger 114. Starting at the compressor 116, the compressor 116 may be operated to compress refrigerant and pump the relatively high temperature and high pressure compressed refrigerant through the reversing valve 122 and to the outdoor heat exchanger 114, where the refrigerant may transfer heat to an airflow that is passed through and/or into contact with the outdoor heat exchanger 114 by the outdoor fan 118. After exiting the outdoor heat exchanger 114, the refrigerant may flow through and/or bypass the outdoor metering device 120, such that refrigerant flow is not substantially restricted by the outdoor metering device 120. Refrigerant generally exits the outdoor metering device 120 and flows to the indoor metering device 112, which may meter the flow of refrigerant through the indoor metering device 112, such that the refrigerant downstream of the indoor metering device 112 is at a lower pressure than the refrigerant upstream of the indoor metering device 112. From the indoor metering device 112, the refrigerant may enter the indoor heat exchanger 108. As the refrigerant is passed through coil 109 of the indoor heat exchanger 108, heat may be transferred to the refrigerant from an airflow that is passed through and/or into contact with the indoor heat exchanger 108, the airflow being produced by the indoor fan 110 with the impeller 113 of indoor fan 110 rotating in the nominal direction 117. Refrigerant leaving the indoor heat exchanger 108 may flow to the reversing valve 122, where the reversing valve 122 may be selectively configured to divert the refrigerant back to the compressor 116, where the refrigeration cycle may begin again.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may re-enter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode. Thus, in the heating mode, heat is transferred from the refrigerant to an airflow that is passed through and/or into contact with the indoor heat exchanger 108, the airflow being produced by the indoor fan 110 with the impeller 113 of indoor fan 110 rotating in the nominal direction 117.

Figure 2:
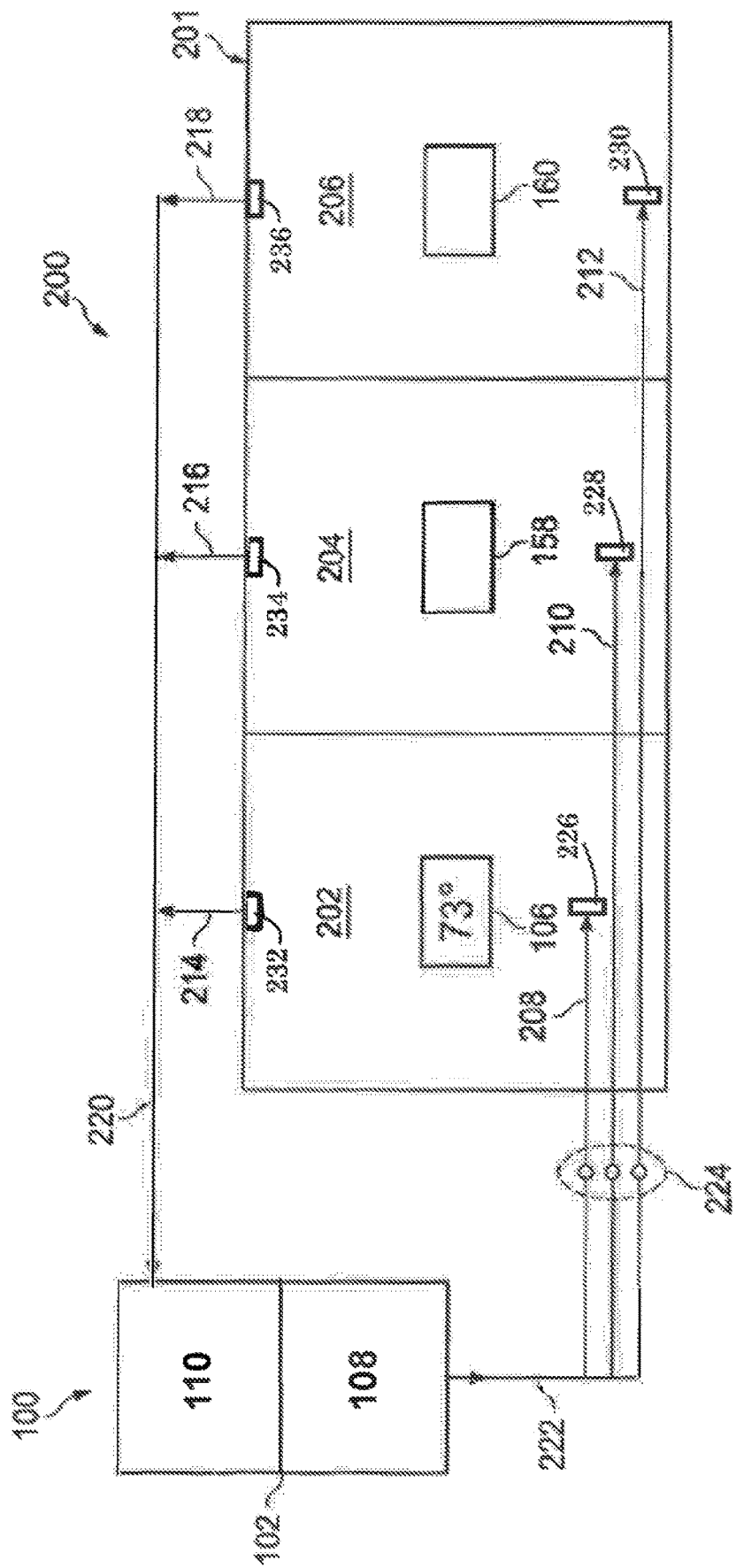
FIG. 2 is a schematic diagram of an air circulation path of the HVAC system of FIG. 1 according to an embodiment of the disclosure.

Referring now to FIG. 2, a schematic diagram of an air circulation path 200 of the HVAC system 100 of FIG. 1 is shown according to an embodiment of the disclosure. It will be appreciated that while three zones 202, 204, 206 are shown, any number of zones, including a single zone, may be present in a structure or indoor space 201. Where present, the plurality of zones may be conditioned independently or together in one or more groups. The air circulation path 200 of the HVAC system 100 may generally comprise or be defined by a first zone supply duct 208, a second zone supply duct 210, a third zone supply duct 212, a first zone return duct 214, a second zone return duct 216, a third zone return duct 218, a main return duct 220, and a main supply duct 222. A plurality of zone dampers 224 may be optionally provided. The air circulation path 200 also passes through the indoor unit 102, which may include an indoor heat exchanger 108 and an indoor fan 110.

The air circulation path 200 of HVAC system 100 may also include a plurality of supply registers 226, 228 and 230, and a plurality of return registers 232, 234, and 236. Supply registers 226, 228, and 230 each define an interface between an end of one of the zone supply ducts 208, 210, and 212 and one of the zones 202, 204, and 206 of the air circulation path 200. For instance, a first supply register 226 defines the interface between an end of the first zone supply duct 208 and the first zone 202 whereby air flowing through first zone supply duct 208 passes through first supply register 226 before entering first zone 202. Similarly, return registers 232, 234, and 236 each define an interface between an end of one of the zone return ducts 214, 216, and 218 and one of the zones 202, 204, and 206 of the air circulation path 200. For example, a first return register 232 defines the interface between the first zone 202 and an end of the first zone return duct 214 whereby air within first zone 202 passes through first return register 232 prior to entering first zone return duct 214. Each register 226, 228, 230, 232, 234, and 236 of HVAC system 100 may comprise a frame including a grille and a damper positioned in the frame that is moveable between an open position and a closed position configured to restrict or inhibit airflow therethrough.

In operation, the indoor fan 110 may be configured to generate an airflow through the indoor unit 102 by rotating impeller 113 in the nominal direction 117 to deliver temperature conditioned air from an air supply opening in the indoor unit 102, through the main supply duct 222, and to each of the plurality of zones 202, 204, 206 through each of the first zone supply duct 208, the second zone supply duct 210, and the third zone supply duct 212, respectively. Additionally, each of the first zone supply duct 208, the second zone supply duct 210, and the third zone supply duct 212 may optionally comprise a zone damper 224 that regulates the airflow to each of the zones 202, 204, 206. In some embodiments, the zone dampers 224 may regulate the flow to each zone 202, 204, 206 in response to a temperature or humidity sensed by at least one temperature sensor and/or humidity sensor carried by at least one of the system controller 106, a zone thermostat 158, and a zone sensor 160. In some embodiments, system controller 106 may be located external of indoor space 201, and indoor space 201 may not include zone thermostat 158 and/or zone sensor 160.

Air from each zone 202, 204, 206 may return to the main return duct 220 through each of the first zone return duct 214, the second zone return duct 216, and the third zone return duct 218. From the main return duct 220, air may return to the indoor unit 102 through an air return opening in the indoor unit 102. Air entering the indoor unit 102 through the air return opening may then be conditioned for delivery to each of the plurality of zones 202, 204, 206 as described above. Circulation of the air in this manner may continue repetitively until the temperature and/or humidity of the air within the zones 202, 204, 206 conforms to a target temperature and/or humidity as required by at least one of the system controller 106, the zone thermostat 158, and/or the zone sensor 160.

As described above, during operation a request may be communicated to indoor fan controller 142 (shown in FIG. 1) of indoor fan 110 from system controller 106 (shown in FIG. 1) representative of, or corresponding to, a desired airflow. Based on this requested airflow command and prior knowledge of the performance of indoor fan 110 in the indoor product application, the system controller 106 may estimate the airflow and the external static pressure (ESP) provided by indoor fan 110 with impeller 113 rotating in the nominal direction 117 by continuously measuring motor speed and torque of the indoor fan motor 115 of indoor fan 110 using sensor package 121. Particularly, components of indoor unit 102, including indoor heat exchanger 108 and indoor fan 110 (including indoor fan motor 115), may be housed within a cabinet to form a self-contained air handling unit (AHU). Prior to installation of indoor unit 102 at indoor space 201, the AHU of indoor unit 102 (or another test AHU, including a test indoor fan, similar in configuration to the AHU of indoor unit 102) may be tested at an air plenum test facility at a range of known airflows and ESPs (i.e., independently measured by equipment of the test facility) to thereby create AHU maps correlating airflow and ESP of the AHU with motor speed and torque of the indoor fan 110 of the AHU. As a non-limiting example, a first AHU map may include airflow along an X-axis thereof, motor power (which may be calculated from a measured motor torque) along a Y-axis thereof, and a plurality of curves each corresponding to a fixed motor speed. In this manner, an estimated airflow may be "looked-up" from the AHU map from a known motor speed and torque. A second AHU map may include airflow along an X-axis thereof, ESP along a Y-axis thereof, and a plurality of curves each corresponding to a fixed motor speed, from which an estimated ESP may be looked-up given the known motor speed and airflow (determined from the first AHU map). However, additional functional relationships for airflow and ESP may be used to correlate measured motor speed and torque with estimated airflow and ESP.

The AHU maps created during testing may be stored in the memory of the system controller 106. In this manner, system controller 106 of HVAC system 100 may apply measured motor speed and torque values communicated to system controller 106 from indoor fan controller 142 to the AHU maps stored in the memory of system controller 106 to thereby determine or look-up an estimated airflow of the indoor fan 110 corresponding to the motor speed and torque of the indoor fan 110 measured by sensor package 121. In some embodiments, the AHU maps may be stored in a memory of indoor fan controller 142, and indoor fan controller 142 may apply motor speed and torque values measured by sensor package 121 to the AHU maps stored in the memory thereof to determine the estimated airflow of indoor fan 110 corresponding to the measured motor speed and torque of the indoor fan 110. As will be discussed further herein, the memory of a controller of HVAC system 100 (e.g., the memory of indoor controller 106 and/or the memory of indoor fan controller 142) may include a forward or nominal AHU map or a set of first or nominal AHU maps corresponding to indoor fan 110 when the indoor fan 110 is operated such that impeller 113 is rotated in the nominal direction 117. In other words, the nominal AHU maps corresponding to indoor fan 110 may be created by rotating the impeller 113 of the indoor fan 110 of indoor unit 102 (or another test AHU, including a test indoor fan, similar in configuration to the AHU of indoor unit 102) during the testing of the indoor unit 102 at the air plenum test facility in the nominal direction 117.

Figure 3:
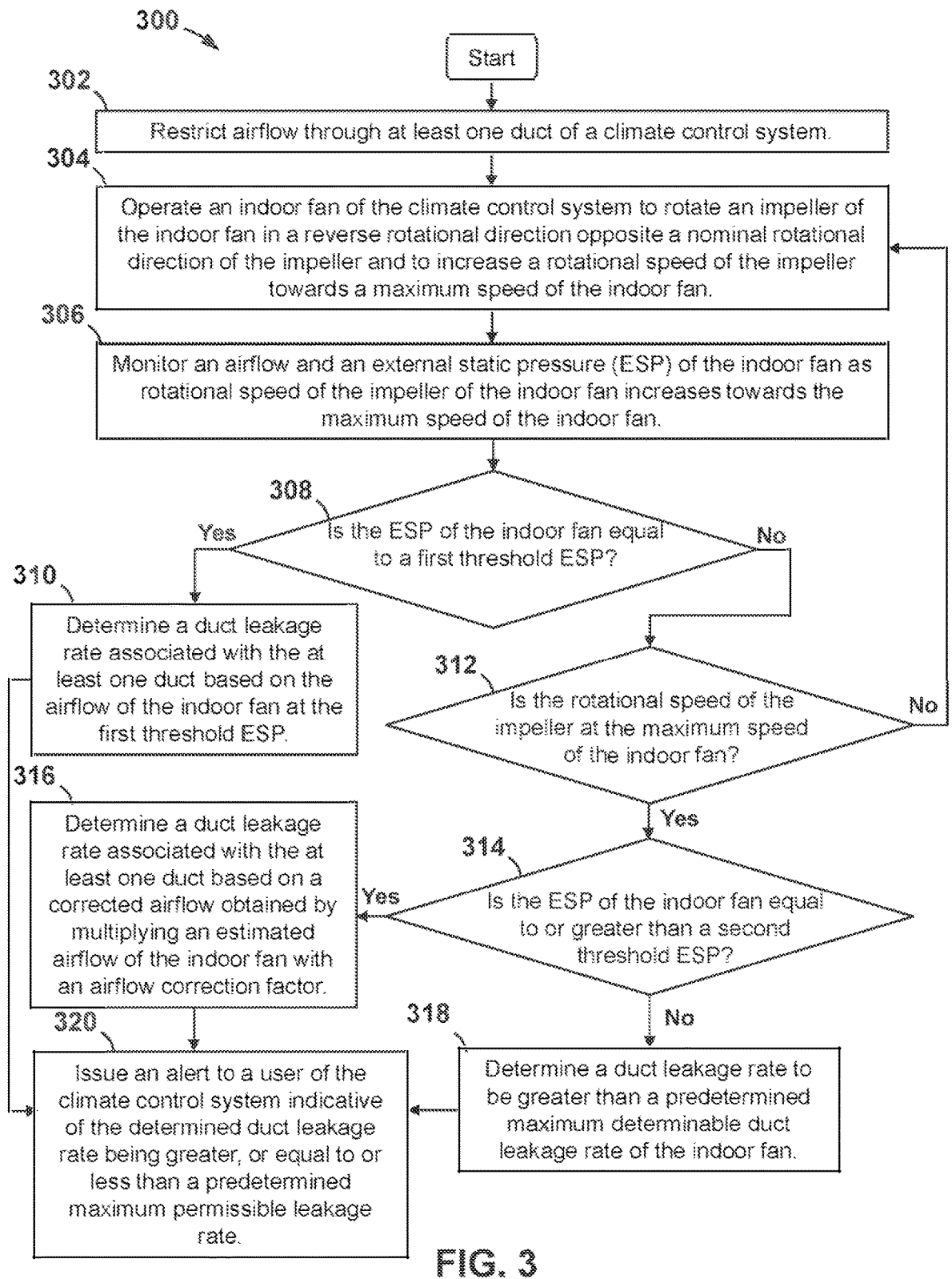
FIG. 3 is a flow chart of a method of determining duct leakage in a climate control system according to some embodiments.

Referring now to FIGS. 1-3, a method 300 of determining duct leakage in a climate control system is shown in FIG. 3. In some embodiments, method 300 may be practiced with HVAC system 100 as previously described above (see e.g., FIGS. 1, 2). Thus, in describing the features of method 300, continuing reference will made to the HVAC system 100 shown in FIGS. 1, 2; however, it should be appreciated that embodiments of method 300 may be practiced with other systems, assemblies, and devices.

Generally speaking, method 300 includes restricting airflow through at least one duct (e.g., at least one of ducts 208, 210, 212, 214, 216, 218, 220, and 222 of the air circulation path 200) of a climate control system (e.g., the HVAC system 100). Method 300 may also generally include operating an indoor fan (e.g., indoor fan 110) of the climate control system to rotate an impeller (e.g., impeller 113) of the indoor fan in a reverse rotational direction (e.g., reverse direction 119) opposite a nominal rotation direction (e.g., nominal direction 117) of the impeller. Method 300 may further include determining or monitoring an airflow produced by the indoor fan when the impeller of the indoor fan is rotated in the reverse rotational direction, and determining a duct leakage rate associated with the at least one duct based on the airflow produced by the indoor fan. As will be described in more detail below, performance of some or all of the steps of method 300 may be cyclical or repeated during the operational lifetime of the climate control system so as to continually monitor a condition (e.g., leakage in one or more ducts) of the climate control system.

Initially, method 300 includes restricting airflow through at least one duct of a climate control system at block 302. In some embodiments, block 302 may comprise a user of HVAC system 100 (e.g., a system installer of HVAC system 100 and/or a technician qualified to service HVAC system 100) sealing-off the supply ducts 208, 210, 212, 222, and/or the return ducts 214, 216, 218, 220 of the air circulation path 200 of HVAC system 100. For example, if it is desired by the user of HVAC system 100 to determine duct leakage in only the supply ducts 208, 210, 212, 222 and not in return ducts 214, 216, 218, 220, then block 302 may include sealing-off each of the supply ducts 208, 210, 212, and 222. If it is instead desired by the user of HVAC system 100 to determine duct leakage in return ducts 214, 216, 218, 220 then block 302 may include sealing-off each of the return ducts 214, 216, 218, and 220.

As will be described further herein, the user of HVAC system 100 may independently determine duct leakage in either the supply ducts 208, 210, 212, 220 or the return ducts 214, 216, 218, 220 of air circulation path 200 by selectively choosing to restrict airflow through supply ducts 208, 210, 212, 222 or return ducts 214, 216, 218, 220. In this manner, if duct leakage is present, the user of HVAC system 100 may determine if the leak is in either one of the supply ducts 208, 210, 212, 222 or in one of the return ducts 214, 216, 218, 220. In some embodiments, block 302 includes sealing-off at least one duct of HVAC system 100 (e.g., ducts 208, 210, 212, 214, 216, 218, 220, and/or 222) by sealing a register (e.g., registers 226, 228, 230, 232, 234, and/or 236) positioned at an end of the duct or ducts to be sealed. For instance, a user may seal-off zone supply ducts 208, 210, and 212 by sealing the supply registers 226, 228, and 230, respectively, via, for example, sealably covering each of the grilles of supply registers 226, 228, and 230 with adhesive tape, plastic wrap, a non-adhesive reusable seal and/or other means for quickly, conveniently, and cost-effectively sealing supply registers 226, 228, and 230. Alternatively, block 302 may comprise restricting airflow through at least one duct of the climate control system by closing a zone damper associated with the at least one duct. For example, block 302 may comprise restricting airflow through main supply duct 222 by closing each of the plurality of zone dampers 224. In some embodiments, system controller 106 may close zone dampers 224 either automatically via instructions stored in the memory of system controller 106 for automatically periodically evaluating duct leakage in HVAC system 100, or in response entering a request into I/O unit 107.

Method 300 also includes operating an indoor fan of the climate control system to rotate an impeller of the indoor fan in a reverse rotational direction opposite a nominal rotational direction of the impeller and to increase a rotational speed of the impeller towards a maximum speed of the indoor fan at block 304. In some embodiments, block 304 may comprise operating the indoor fan 110 of HVAC system 100 such that impeller 113 is rotated in the reverse direction 119 and a rotational speed of impeller 113 in the reverse direction 119 is continuously increased towards a maximum speed of indoor fan 110. For example, block 304 may include placing HVAC system 100 into an idle mode whereby indoor fan 110 of HVAC system 100 remains idle and air is not circulated along the air circulation path 200. The compressor 116 may also be inactive during the idle mode such that refrigerant is not actively being circulated through the heat exchanger 108.

Block 304 of method 300 may comprise transmitting a maximum reverse speed request from system controller 106 of HVAC system 100 to the indoor fan controller 142 such that a speed and an airflow produced by indoor fan 110 continuously increases from zero (corresponding to the idle mode of HVAC system 100) towards a maximum speed of the impeller 113 that may be provided by the indoor fan 110 in the reverse direction 119. In certain embodiments, system controller 106 of HVAC system 100 may transmit the maximum reverse speed request to indoor fan controller 142 in response to an input provided to system controller 106 (e.g., via I/O unit 107 and/or device 130 of HVAC system 100) provided by a user of HVAC system 100 (e.g., a system installer of HVAC system 100 or a technician equipped to service HVAC system 100). Additionally, block 304 may comprise placing HVAC system 100 into a fan-only mode as the speed of indoor fan 110 increased where compressor 116 of outdoor unit 104 remains idle so that refrigerant is not circulated through indoor heat exchanger 108 as the speed of indoor fan 110 is increased.

As described above, indoor fan 110 produces airflow from an outlet thereof when impeller 113 is rotated in the reverse direction 119, and thus reversing the direction of rotation of impeller 113 does not reverse the direction of airflow produced by indoor fan 110. However, given that impeller 113 of indoor fan 110 is configured to be operated or rotated in the nominal direction 117 when HVAC system 100 is in the cooling and heating modes, operating indoor fan 110 to rotate impeller 113 in the reverse direction 119 may alter one or more performance characteristics of indoor fan 110 relative to the performance characteristics of indoor fan 110 when operated to rotate impeller 113 in the nominal direction 117. In other words, impeller 113 of indoor fan 110 is configured such that the direction in which impeller 113 rotates affects the performance of indoor fan 110.

For example, rotating impeller 113 in the reverse direction 119 may decrease a fan or blower efficiency of indoor fan 110 whereby the amount of airflow produced by indoor fan 110 (e.g., airflow in cubic feet per minute (CFM)) at a given input power (e.g., electrical input power in Watts (W)) provided to the indoor fan 110 is decreased. Thus, rotating impeller 113 in the reverse direction 119 may decrease the amount of airflow produced by indoor fan 110 at a given rotational speed (e.g., rotational speed in revolutions per minute (RPM)) of impeller 113. Further, given that ESP produced by indoor fan 110 is dependent upon the amount of airflow produced by indoor fan 110, rotating impeller 113 in the reverse direction 119 may decrease the amount of ESP produced by indoor fan 110 (e.g., ESP in inches of water (in $H_2O$)) at a given rotational speed of impeller 113.

Indoor fan 110 of HVAC system 100 may have an operational range of rotational speeds ranging approximately between a minimum speed and a maximum speed, where operating indoor fan 110 at speeds less than the minimum speed and/or greater than the maximum speed may jeopardize the reliability of indoor fan 110 over its operational life as well as interfere with the performance of indoor fan 110. For instance, operating indoor fan 110 at a speed less than the minimum operating speed may reduce the accuracy or resolution of the sensors of sensor package 121 configured to measure speed and torque of fan motor 115, thereby interfering with the determination or estimation of airflow and ESP produced by indoor fan 110 that is based on the measurements provided by the sensors of fan motor 115 as described above.

In view of the above, it may be desirable to avoid operating indoor fan 110 at a rotational speed outside of the operational range of indoor fan 110. In some embodiments, the operational range of indoor fan 110 is approximately between 200 RPM and 1,500 RPM; however, in other embodiments, the operational range of indoor fan 110 may vary. In some embodiments, the average amount of airflow produced by indoor fan 110 across the operational range of indoor fan 110 may be reduced by approximately 85% when impeller 113 is rotated in the reverse direction 119; however, the decrease in airflow resulting from rotating impeller 113 in the reverse direction 119 rather than the nominal direction 117 may vary. In certain embodiments, the average amount of ESP produced by indoor fan 110 across the operational range of indoor fan 110 may be reduced by approximately 80% when impeller 113 is rotated in the reverse direction 119; however, the decrease in ESP resulting from rotating impeller 113 in the reverse direction 119 rather than the nominal direction 117 may vary. In some embodiments, indoor fan 110 may have an efficiency (e.g., air power produced by indoor fan 110 divided by input power supplied to indoor fan 110) of approximately 20% to 50% across its operational range when impeller 113 is rotated in the nominal direction 117, and an efficiency of approximately 2% to 10% across its operational range when impeller 113 is rotated in the reverse direction 119; however, the efficiencies of indoor fan 110 when operated in the nominal and reverse directions 117, 119 may vary.

Method 300 proceeds by monitoring an airflow and an ESP produced by the indoor fan as the rotational speed of the indoor fan increases towards the maximum speed of the indoor fan at block 306. In some embodiments, block 306 comprises monitoring an airflow and an ESP produced by the indoor fan 110 of HVAC system 100 as the rotational speed of indoor fan 110 increases towards the maximum speed of indoor fan 110. The airflow and ESP produced by indoor fan 110 may be monitored by a controller (e.g., system controller 106) of HVAC system 100. For example, the indoor fan controller 142 may transmit motor speed and torque measurements (provided by sensor package 121) of indoor fan motor 115 to system controller 106 where system controller 106 periodically determinates or estimates airflow and ESP produced by the indoor fan 110 based on AHU maps stored in the memory of system controller 106 and the motor speed and torque measurements transmitted from indoor fan controller 142. Alternatively, indoor fan controller 142 and/or other components of HVAC system 100 other than system controller 106 and in signal communication with indoor fan controller 142 may periodically determine the airflow and ESP produced by the indoor fan 110 based on AHU maps stored in the memory of indoor fan controller 142 and/or the other components of HVAC system 100. In other embodiments, a flow sensor positioned upstream and/or downstream of indoor fan 110 may be used to measure airflow produced by indoor fan 110.

In this embodiment, given that the performance and efficiency of indoor fan 110 is dependent upon the direction which impeller 113 is rotated, the AHU maps utilized by system controller 106 to estimate the airflow and ESP produced by indoor fan 110 as impeller 113 is rotated in the reverse direction 119 comprise a second or reverse AHU map or set of second or reverse AHU maps corresponding to the indoor fan 110 when the indoor fan 110 is operated to rotate impeller 113 in the reverse direction 119. Thus, the memory of system controller 106 (or, alternatively, the memory of indoor fan controller 142) may include one or more nominal AHU maps for estimating airflow and ESP produced by indoor fan 110 when impeller 113 is rotated in the nominal direction 117 and one more reverse AHU maps for estimating airflow and ESP produced by indoor fan 110 when impeller 113 is rotated in the reverse direction 119. The one or more reverse AHU maps corresponding to indoor fan 110 may be created in a manner similar to the creation of the one or more nominal AHU maps described above. Particularly, prior to installation of indoor unit 102 at indoor space 201, the AHU of indoor unit 102 (or another test AHU, including a test indoor fan, similar in configuration to the AHU of indoor unit 102) may be tested at an air plenum test facility with the impeller of the test indoor fan rotated in a rotational reverse direction at a range of known airflows and ESPs to thereby create one or more reverse AHU maps correlating airflow and ESP of the AHU with motor speed and torque of the indoor fan 110 of the AHU when impeller 113 of indoor fan 110 is rotated in the reverse direction 119.

Method 300 also includes determining whether the ESP of indoor fan 110 (monitored at block 306) is equal to a first threshold ESP at block 308. In some embodiments, block 308 comprises determining whether a current or most recently determined ESP of the indoor fan 110 of HVAC system 100 is equal to a predetermined first threshold ESP. For example, as the airflow and ESP produced by indoor fan 110 is monitored by a controller of HVAC system 100 (e.g., system controller 106), the controller may periodically compare the most recently determined ESP of indoor fan 110 with the first threshold ESP to determine whether the ESP of indoor fan 110 is equal to the first threshold ESP, where the first threshold ESP may be pre-stored in the memory of the controller prior to the installation of HVAC system 100. In some embodiments, the first threshold ESP is approximately 0.1 in $H_2O$; however, in other embodiments, the first threshold ESP may vary. For instance, in certain embodiments, the first threshold ESP may range approximately been 0.08 in $H_2O$ and 0.12 in $H_2O$.

The certainty and accuracy in which duct leakage may be detected may generally increase as ESP produced by the indoor fan 110 is increased given that increasing ESP increases in-turn the amount of observable duct leakage within HVAC system 100 when a leak in present one of the ducts (e.g., ducts 208, 210, 212, 214, 216, 218, 220, and/or 222) of HVAC system 100. However, the amount of ESP that may be utilized for determining duct leakage in HVAC system 100 may be limited by the quality of seal employed to seal-off the duct to be evaluated for leakage at an end thereof. Specifically, sealing mechanisms which may be quickly and cost-effectively employed to seal, for example, supply registers 226, 228, and 230 to thereby seal-off zone supply ducts 208, 210, and 212, such as plastic wrap, may be unable to maintain a seal of supply registers 226, 228, and 230 at ESPs substantially greater than 0.1 in $H_2O$, necessitating the use of more expensive and cumbersome to install specialized sealing mechanisms if an ESP of substantially greater than 0.1 in $H_2O$ is employed to evaluate duct leakage.

Further, the airflow provided by commonly utilized indoor fans of climate control systems at low ESPs (e.g., an ESP of 0.1 in $H_2O$) when the impeller of the indoor fan is rotated at a speed within the operational range of the indoor fan may be too great for determining duct leakage when the impeller is rotated in the nominal direction (e.g., nominal direction 117). In other words, the minimum speed of the indoor fan of a climate control system in at least some applications may produce an airflow or ESP of a magnitude (when the indoor fan is operating in the nominal direction) which prevents the sealing of a duct of the climate control system to be evaluated using a conveniently installable sealing mechanism (e.g., plastic wrap, etc.). Thus, in at least some applications, a more expensive and cumbersome to install specialized sealing mechanism may be required to seal-off the duct to be evaluated at an end thereof when the indoor fan of the climate control system (being operated in the nominal direction) is utilized to determine duct leakage.

However, by operating the indoor fan 110 in the reverse direction (e.g., operating indoor fan 110 to rotate impeller 113 in the reverse direction 119), the efficiency of the indoor fan may be degraded to an extent sufficient to permit the indoor fan to produce an ESP equal to the first threshold ESP while remaining within the operational range of the indoor fan. Particularly, impeller 113 of indoor fan 110 comprises a plurality of impeller blades each having a geometry configured to maximize the efficiency of indoor fan 110 (e.g., airflow produced by indoor fan 110 at a given input power) when impeller 113 is rotated in the nominal direction 117. In other words, impeller 113 is specifically designed to be rotated in the nominal direction 117 during operation of indoor fan 110 in order to maximize the efficiency of indoor fan 110. Thus, the performance of the blades of impeller 113 (e.g., the ability of the blades to create airflow at a given rotational speed of impeller 113) depends upon the direction in which impeller 113 is rotated, with the performance of impeller 113 being degraded or reduced when impeller 113 is rotated in the reverse direction 119 relative to the performance of impeller 113 when rotated in the nominal direction 117. Therefore, by operating indoor fan 110 in the reverse direction 119, indoor fan 110 may be utilized to determine or evaluate duct leakage in HVAC system 100 while also employing a cost effective and convenient to install sealing mechanism (e.g., plastic wrap, etc.) to seal-off the duct (e.g., ducts 208, 210, 212, 214, 216, 218, 220, and/or 222) of HVAC system 100 to be evaluated.

Moreover, by operating indoor fan 110 in the reverse direction 119 to produce a low ESP equal to the first threshold ESP, duct leakage in HVAC system 100 may be evaluated without needing to seal-off the ducts thereof. For example, duct leakage in main supply duct 222 of HVAC system 100 may be evaluated by closing zone dampers 224 to restrict airflow through supply duct 222. Although some leakage across closed zone dampers 224 would occur with indoor fan 110 operated in the reverse direction 119, the amount of leakage across zone dampers 224 at the low, first threshold ESP would be minimal enough to permit evaluation of duct leakage within main supply duct 222. Particularly, prior to installation of indoor unit 102 at indoor space 201, zone dampers 224 may be tested at a test facility at a range of known airflows and ESPs (i.e., independently measured by equipment of the test facility), including the first threshold ESP, to thereby map or characterize the expected airflow leaking across each zone damper 224 for the range of tested airflows and ESPs when the zone damper 224 is closed. The mapped leakage characteristics of zone dampers 224 may be stored in the memory of system controller 106 prior to installation of HVAC system 100.

If it is determined that the ESP of the indoor fan is equal to the first threshold ESP (i.e., the determination at block 308 is "Yes"), method 300 may proceed by determining a duct leakage rate associated with the at least one duct at block 310. The duct leakage rate is based on the airflow of the indoor fan 110 at the first threshold ESP at block 310. The airflow of indoor fan 110 from which the duct leakage rate is based on may be determined by system controller 106 based on the motor speed and torque measured by sensor package 121 of fan motor 115 and the one or more reverse AHU motor maps stored in the memory of system controller 106. In some embodiments, block 310 may also include returning ceasing rotation of the impeller 113 of indoor fan 110 in the reverse direction 119 and returning HVAC system 100 to the idle mode.

In some embodiments, block 310 comprises determining a duct leakage rate associated with either supply ducts 208, 210, 212, and 222, or return ducts 220, 232, 234, and 26 of HVAC system 100 based on the estimated airflow of indoor fan 110 (e.g., airflow estimated by system control 106 as described above) at the first threshold ESP. For example, when airflow is restricted in each of supply ducts 208, 210, 212, and 222 at block 302, the duct leakage rate determined at block 310 comprises the collective duct leakage in supply ducts 208, 210, 212, and 222 of HVAC system 100 at the first threshold ESP (the first threshold ESP in supply ducts 208, 210, 212, 222 comprising a positive ESP produced by indoor fan 110). Conversely, when airflow is restricted in each of return ducts 214, 216, 218, and 220 at block 302, the duct leakage rate determined at block 310 comprises the collective duct leakage in return ducts 214, 216, 218, and 220 of HVAC system 100 at the first threshold ESP (the first threshold ESP in return ducts 214, 216, 218, and 220 comprising a negative ESP or vacuum produced by indoor fan 110).

Additionally, the duct leakage rate determined at block 310 may comprise the estimated airflow of indoor fan 110 at the first threshold ESP when airflow is restricted in the ducts (either each of the supply ducts or each of the return ducts) of HVAC system 100 to be evaluated. For example, if airflow is restricted in supply ducts 208, 210, 212, and 222 by sealing supply registers 226, 228, and 230, and an estimated airflow of approximately 124 CFM is provided by the indoor fan 110 (where indoor fan 110 is operated in the reverse direction 119) at a first threshold ESP comprising 0.1 in H$_2$O, then the duct leakage rate in supply ducts 208, 210, 212, and 222 is determined to be approximately 124 CFM. Additionally, in embodiments where airflow is restrict through the at least one duct (e.g., main supply duct 222) by closing the zone dampers (e.g., zone dampers 224) associated with the at least one duct rather than sealing-off an end of the at least one duct (via plastic wrap, etc.), the duct leakage rate determined at block 310 may comprise correcting the duct leakage rate based on the airflow of the indoor fan 110 at the first threshold ESP (determined from motor speed and torque measured by sensor package 121 of fan motor 115 and the one or more reverse AHU motor maps) by the mapped leakage characteristics of the closed ducts stored in the memory of system controller 106. For example, if airflow through main supply duct 222 is restricted by the closure of zone dampers 224, and an estimated airflow of approximately 124 CFM is provided by the indoor fan 110 at a first threshold ESP comprising 0.1 in H$_2$O, and a leakage rate of approximately 5 CFM is estimated at an ESP of 0.1 in H$_2$O based on the mapped leakage characteristics of zone dampers 224, then the duct leakage rate would be determined to be 119 CFM.

The duct leakage rate may also be expressed as a percentage of a nominal airflow rate of indoor fan 110. In some embodiments, the nominal airflow rate of indoor fan 110 may be the amount of airflow produced by indoor fan 110 when HVAC system 100 is operated in either the cooling or heating modes with the impeller 113 of indoor fan 110 being rotated in the nominal direction 117. The nominal airflow rate may be pre-stored in the memory of system controller 106 prior to the installation of HVAC system 100. For instance, when HVAC system 100 is placed in either the cooling or heating modes to satisfy a demand for cooling or heating, system controller 106 may request indoor fan controller 142 to operate indoor fan 110 to produce the nominal airflow rate, whereby indoor fan controller 142 provides an input power to the indoor fan motor 115 sufficient to produce a motor speed and torque of indoor fan motor 115 corresponding to the nominal airflow rate based on the one or more nominal AHU maps of indoor fan 110.

As an example of expressing the duct leakage, a memory of a controller of HVAC system 100 (e.g., system controller 106) may include a nominal airflow rate of 1,500 CFM corresponding to the nominal airflow rate of an indoor fan (e.g., indoor fan 110) of the climate control system and thus, the 124 CFM of airflow estimated by the controller when airflow is restricted in supply ducts 208, 210, 212, and 222 provides a duct leakage rate associated with supply ducts 208, 210, 212, and 222 of approximately 8.3% of the nominal airflow rate at the first threshold ESP in this example. Thus, a controller of HVAC system 100 may determine a duct leakage rate associated with either the supply ducts 208, 210, 212, and 222, or the return ducts 220, 232, 234, and 236 of HVAC system 100 at the first threshold ESP in either CFM (with airflow being restricted through the at least one duct) or as a percentage of nominal airflow rate of the indoor fan 110 of HVAC system 100.

If it is determined that the most recently determined ESP of the indoor fan is not equal to the first threshold ESP (i.e., the determination at block 308 is "No"), method 300 may proceed by determining whether the rotational speed of the impeller of indoor fan is at the maximum speed of the indoor fan at block 312. In at least some embodiments, block 312 comprises determining whether indoor fan 110 of HVAC system 100 is at a maximum speed thereof. For example, a controller of HVAC system 100 (e.g., system controller 106) may determine, based on the motor speed and torque measured by sensor package 121, whether indoor fan 110 is at the maximum speed thereof as defined by the operational range of indoor fan 110.

If it is determined that the rotational speed of the impeller is not at the maximum speed of the indoor fan (i.e., the determination at block 312 is "No"), method 300 may return again to block 304 and continue to increase the rotational speed of the impeller towards the maximum speed of the indoor fan, the airflow and ESP produced by the indoor fan being monitored at block 306 as the rotational speed of the indoor fan increased towards the maximum speed thereof. Thus, in some embodiments, blocks 308 and 312 may be performed periodically or cyclically as the rotational speed of the fan continues towards the maximum thereof until the "Yes" determination is made at either block 308 or block 312. For example, as the rotational speed of the impeller 113 of indoor fan 110 increases towards a maximum rotational speed of indoor fan 110, a controller of HVAC system 100 (e.g., system controller 106) may periodically check or determine if either the ESP of indoor fan 110 is equal to the first threshold ESP (at block 308) or if the rotational speed of the impeller 113 has reached the maximum speed of indoor fan 110 (at block 312).

If it is determined that the rotational speed of the impeller is at the maximum speed of the indoor fan (i.e., the determination at block 312 is "Yes"), method 300 may proceed by determining whether the ESP of the indoor fan is equal to or greater than a second threshold ESP at block 314. In at least some embodiments, block 314 comprises determining whether a current or most recently determined ESP of the indoor fan 110 of HVAC system 100 is equal to or greater than a predetermined second threshold ESP which is less than the first threshold ESP of block 308. For example, as the airflow and ESP produced by indoor fan 110 is monitored by a controller of HVAC system 100 (e.g., system controller 106), the controller may periodically compare the ESP of indoor fan 110 with the second threshold ESP to determine whether the most recently determined ESP of indoor fan 110 is equal to or greater than the second threshold ESP, where the second threshold ESP may be pre-stored in the memory of the controller prior to the installation of HVAC system 100. In some embodiments, the second threshold ESP is approximately 0.05 in H$_2$O; however, in other embodiments, the second threshold ESP may vary. For instance, in certain embodiments, the second threshold ESP may range approximately been 0.02 in H$_2$O and 0.07 in H$_2$O. In certain embodiments, block 314 may also include ceasing rotation of the impeller 113 of indoor fan 110 in the reverse direction 119 and returning HVAC system 100 to the idle mode.

As described above, the accuracy in which duct leakage may be detected generally decreases as the ESP of the indoor fan 110 at which the duct leakage determination is made decreases. Moreover, the more the second threshold ESP is reduced relative to the first threshold ESP, the greater the extrapolation that is made from the second threshold ESP to the first threshold ESP, reducing the accuracy of the duct leakage determination. Thus, the second threshold ESP, being lower than the first threshold ESP, may provide a lower bound where duct leakage may not be accurately determined utilizing indoor fan 110 at an ESP that is less than the second threshold ESP. In applications where a relatively large leak is formed (e.g., a leak having a leakage rate equal to or greater than 15%, for example) in either the supply ducts or return ducts to be evaluated, indoor fan 110 may only be able to produce an ESP that is between the first and second threshold ESPs. As described below, method 300 provides a means for determining a duct leakage rate in applications having a relatively large leak in the at least one duct to be evaluated whereby the indoor fan (e.g., indoor fan 110) is prevented from achieving the first threshold ESP even when operating at the maximum speed of the indoor fan.

If it is determined that the most recently determined ESP of the indoor fan is equal to or greater than the second threshold ESP (i.e., the determination at block 314 is "Yes"), method 300 may proceed by determining a duct leakage rate associated with the at least one duct based on a corrected airflow obtained by multiplying an estimated airflow of the indoor fan by an airflow correction factor at block 316. In some embodiments, block 316 comprises determining a duct leakage rate associated with either the supply ducts 208, 210, 212, and 222, or the return ducts 220, 232, 234, and 236 of HVAC system 100 based on a corrected airflow obtained by multiplying an estimated airflow of indoor fan 110 (estimated, e.g., from the motor speed and torque measured by sensor package 121 of fan motor 115 and the one or more reverse AHU motor maps stored in the memory of system controller 106) by an airflow correction factor.

Generally, ESP produced by indoor fan 110 is positively correlated with airflow produced by indoor fan 110. Given the positive correlation between airflow and produced ESP, a corrected airflow at the first threshold ESP of indoor fan 110 may be determined or interpolated from the estimated airflow of indoor fan 110 at the currently or most recently determined ESP of the indoor fan using the airflow correction factor. For example, without being limited to this or any other theory, the airflow correction factor (Airflow$_{correction}$) may be obtained by the following computation, where the first threshold ESP is represented by P$_{nominal}$, the current or most recently determined ESP of the indoor fan is represented by P$_{actual}$, and n represents a predetermined constant equal to 0.6 in this example:

$$\text{Airflow}_{correction} = \left(\frac{P_{nominal}}{P_{actual}}\right)^n \quad (1)$$

The rate of duct leakage may be obtained by multiplying the estimated airflow of the indoor fan 110 (estimated from the motor speed and torque measured by sensor package 121 of fan motor 115 and the one or more reverse AHU motor maps stored in the memory of system controller 106) at the most recently determined ESP of the indoor fan by the correction factor Airflow$_{correction}$, which may be determined in accordance with Equation (1) above. Thus, in the example provided above, P$_{nominal}$, is equal to approximately 0.1 in H$_2$O, P$_{actual}$, is equal to approximately 0.07 in H$_2$O, and the correction factor Airflow$_{correction}$ is equal to approximately 1.24 according to Equation (1), thereby providing a duct leakage rate of approximately 124 CFM at the first threshold ESP of 0.1 in H$_2$O. In this example, n of Equation (1) comprises a predetermined constant equal to 0.6 which may be pre-stored, along with Equation (1), in a controller of the climate control system (e.g., system controller 106 of HVAC system 100). Alternatively, n may be determined by creating a curve-fit between a plurality of estimated airflows from indoor fan 110 at a plurality of estimated ESPs ranging between the first and second threshold ESPs.

As with the duct leakage rate determined at block 310, the duct leakage rate in CFM determined at block 316 may also be expressed as a percentage of a nominal airflow rate of the indoor fan 110. For instance, with reference to the example described above, a controller of HVAC system 100 (e.g., system controller 106) may estimate, based on one or more reverse AHU maps stored in a memory thereof, that indoor fan 110 produces 1,500 CFM at the first threshold ESP (0.1 in H$_2$O in this example) when airflow is permitted through supply ducts 208, 210, 212, and 222, and thus, the 124 CFM of corrected airflow estimated by the controller when airflow is restricted in supply ducts 208, 210, 212, and 222 provides a duct leakage rate associated with supply ducts 208, 210, 212, and 222 of approximately 8.3% at the first threshold ESP.

If it is determined that the most recently determined ESP of the indoor fan is not equal to or greater than the second threshold ESP (i.e., the determination at block 314 is "No"), method 300 may proceed by determining a duct leakage rate is greater than a predetermined maximum determinable duct leakage rate of the indoor fan at block 318. In other words, because the indoor fan 110 is unable to reach or exceed the second threshold ESP even though the rotational speed of the impeller of the indoor fan is at the maximum speed thereof, method 300 proceeds at block 318 by determining that the duct leakage rate must be greater than the predetermined maximum determinable duct leakage rate of the indoor fan.

In at least some embodiments, block 318 comprises determining a duct leakage rate associated with at least one duct (e.g., ducts 208, 210, 212, 214, 216, 218, 220, and/or 222) of HVAC system 100 is equal to or greater than a predetermined maximum measurable duct leakage rate of indoor fan 110 of HVAC system 100. In other words, block 318 may include determining that leakage in the at least one duct being evaluated is so great as to exceed the measurement capability of indoor fan 110 with impeller 113 rotated in the reverse direction 119. The maximum determinable duct leakage rate may be determined from the one or more reverse AHU maps stored in the memory of a controller of HVAC system 100. For example, the maximum determinable duct leakage rate may be based on the maximum airflow producible by indoor fan 110 when rotated (in reverse direction 119) at the maximum speed thereof, wherein the maximum airflow estimated from the one or more reverse AHU maps stored in the memory of controller 106 In some embodiments, if the duct leakage rate exceeds the measurement capability of indoor fan 110 with impeller 113 rotated in the reverse direction 119, method 300 may include operating indoor fan 110 in the nominal direction 117 to increase the maximum amount of airflow indoor fan 110 may produce within its operational range and thus the maximum measurable duct leakage rate of indoor fan 110.

Following the determination of the duct leakage rate at either blocks 310, 316, or 318, method 300 further includes issuing an alert to a user of the climate control system indicative of the duct leakage rate determined at blocks 310, 316, or 318 being greater, or equal to or less than a predetermined maximum permissible leakage rate at block 320. In some embodiments, block 320 may indicate a negative result of the evaluation of the at least done duct of the climate control system by issuing an alert to a user of HVAC system 100 (e.g., a homeowner, an installer of HVAC system 100, and/or a technician qualified to service HVAC system 100) indicative of the leakage rate associated with either supply ducts 208, 210, 212, 222 or return ducts 214, 216, 218, 220 being equal to or greater than maximum permissible leakage rate pre-stored in the memory of a controller (e.g., system controller 106) of HVAC system 100 prior to the installation of HVAC system 100. In certain embodiments, block 320 may indicate a positive result by issuing an alert to the user of HVAC system 100 indicative of the leakage rate associated with either supply ducts 208, 210, 212, 222 or return ducts 214, 216, 218, 220 being equal to or less than the maximum permissible leakage rate.

In some embodiments, the maximum permissible leakage rate comprises a leakage rate of approximately 6% of airflow produced by the indoor fan (e.g., indoor fan 110) at an ESP of 0.1 in H$_2$O of the indoor fan; however, in other embodiments, the maximum permissible leakage rate may vary. For instance, the maximum leakage rate may comprise a leakage rate of approximately between 5% and 10% of airflow produced by the indoor fan at an ESP of 0.1 in H$_2$O of the indoor fan. The maximum permissible leakage rate may be set at a value less than a leakage rate to be expected in a newly and properly installed climate control system in typical applications. Thus, the maximum permissible leakage rate may comprise a leakage rate obtainable in a properly installed and functioning climate control system in typical applications, with a duct leakage rate exceeding the maximum permissible leakage rate indicative of an issue in either the installation of the climate control system or a physical defect or malfunction in one or more of the components of the climate control system. For instance, a duct leakage rate (e.g., as determined at one of blocks 310, 316, or 318) in excess of the maximum permissible leakage rate may indicate that the formation and/or enlargement of a leak path in at least one duct of the climate control system which may inhibit or degrade the performance of the climate control system.

Block 320 may comprise transmitting the alert to the user of HVAC system 100 via I/O unit 107 and/or to the device 130 of HVAC system 100 via communication network 132 where the alert may be visually depicted to the user of HVAC system 100. For example, device 130 may comprise a server accessible by a system installer of HVAC system 100. In some embodiments, HVAC system 100 may be serviced by an installer of HVAC system 100 and/or a technician qualified to service HVAC system 100 in response to receiving the alert issued at block 320. For example, the installer of technician may repair one or more ducts of HVAC system 100 (e.g., one or more of ducts 208, 210, 212, 214, 216, 218, 220, and 222) to reduce the duct leakage rate of HVAC system 100. Method 300 may be executed to determine duct leakage in the climate control system upon installation of the climate control system and/or periodically during the operational life of the climate control system to ensure that the duct leakage rate of the climate control system remains less than the maximum permissible leakage rate defined by block 320 of method 300.

Still referring to FIGS. 1-3, through use of the systems and methods described herein (e.g., HVAC system 100, method 300, etc.), duct leakage in a climate control system may be accurately and timely determined or monitored such that any issues or problems related to excessive duct leakage that may interfere with the performance of the climate control system may be timely addressed. Specifically, a climate control system for an indoor space (e.g., HVAC system 100) may be operated to restrict airflow through least one duct (e.g., supply ducts 208, 210, 212, 222 and return ducts 214, 216, 218, 220) of the climate control system (e.g., restricting airflow through at least one duct at block 302 of method 300), operate an indoor fan (e.g., indoor fan 110) of the climate control system to rotate an impeller (e.g., impeller 113 of indoor fan 110) of the indoor fan in a reverse rotational direction (e.g., reverse direction 119) opposite a nominal rotational direction (e.g., nominal direction 117) of the impeller whereby a fan efficiency of the indoor fan is reduced (e.g., operating the indoor fan at block 304 of method 300), determine an airflow of the indoor fan when the impeller of the indoor fan is rotated in the reverse rotational direction (e.g., monitoring an airflow of the indoor fan at block 306 of method 300), and determine a duct leakage rate associated with the at least one duct based on the airflow of the indoor fan (e.g., determination made at one of blocks 310, 316, and 318 of method 300).

Additionally, a controller (e.g., system controller 106 of HVAC system 100) may comprise a non-transitory machine-readable medium including instructions that, when executed by a processor of the controller, cause the processor to operate an indoor fan of the climate control system to rotate an impeller of the indoor fan in a reverse rotational direction opposite a nominal rotational direction of the impeller whereby a fan efficiency of the indoor fan is reduced, determine an airflow of the indoor fan when the impeller of the indoor fan is rotated in the reverse rotational direction, and determine a duct leakage rate associated with the at least one duct based on the airflow of the indoor fan when airflow is restricted in the at least one duct.

By utilizing the indoor fan of the climate control system to determine duct leakage the necessity of utilizing specialized equipment provided by a third party vendor may be avoided. Additionally, duct leakage in one or more supply ducts of the climate control system may be evaluated for leakage independently of one or more return ducts of the climate control system so that the location of a leak (if present) may be identified as coming from either the supply ducts or return ducts of the climate control system. Further, by rotating the impeller of the indoor fan in the reverse direction whereby the performance of efficiency of the indoor fan is degraded, sealing mechanisms (e.g., adhesive tape, plastic wrap, etc.) for quickly and cost-effectively sealing-off the ducts of the climate control system may utilized in lieu of more costly and potentially cumbersome to install specialized sealing mechanisms.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of operating a climate control system for an indoor space, the method comprising:
    operating an indoor fan of the climate control system to rotate an impeller of the indoor fan in a reverse rotational direction opposite a nominal rotational direction of the impeller, wherein the indoor fan is configured to produce an airflow from an inlet to an outlet when the impeller is rotated in the nominal rotational direction and the direction of the airflow produced by the indoor fan does not reverse when the impeller of the indoor fan rotates in the reverse rotational direction;

determining the airflow of the indoor fan when the impeller of the indoor fan is rotated in the reverse rotational direction;

determining a duct leakage rate associated with at least one duct of the climate control system based on the determined airflow, the at least one duct configured to route the airflow directly between the indoor fan and a conditioned space, wherein airflow through the at least one duct is restricted; and determining an external static pressure (ESP) of the indoor fan when the impeller of the indoor fan is rotated in the reverse rotational direction, wherein determining the duct leakage rate is based on a corrected airflow of the indoor fan in response to a determination that the determined ESP is less than a predetermined first threshold ESP, and wherein determining the duct leakage rate further includes determining the duct leakage rate exceeds a predetermined maximum determinable duct leakage rate in response to a determination that the ESP is less than a second predetermined threshold ESP, wherein the second threshold ESP is less than the first threshold ESP.

2. The method of claim 1, wherein the first threshold ESP is between 0.08 inches of $H_2O$ (in H20) and 0.12 in H20 and the second threshold ESP is between 0.02 in H20 and 0.07 in H20.

3. The method of claim 1, wherein:
the climate control system comprises a supply duct and a return duct, and the at least one duct is the supply duct sealed-off at an end thereof and airflow is permitted through the return duct; and
determining the duct leakage rate includes determining a duct leakage rate in the supply duct.

4. The method of claim 1, wherein:
the climate control system comprises a supply duct and a return duct, and the at least one duct is the return duct sealed-off at an end thereof and airflow is permitted through the supply duct; and
determining the duct leakage rate includes determining a duct leakage rate in the return duct.

5. The method of claim 1, wherein determining the airflow of the indoor fan includes determining the airflow from a measured speed and a measured torque of a fan motor of the indoor fan.

6. The method of claim 1, wherein the determined duct leakage rate includes determining a percentage of a nominal airflow rate produced by the indoor fan when the climate control system is activated in at least one of a cooling mode and a heating mode.

7. The method of claim 1, the method further comprising:
issuing an alert to a user of the climate control system indicative of whether the duct leakage rate determined at (c) is greater than or less than a predetermined maximum permissible leakage rate.

8. A method of operating a climate control system for an indoor space, the method comprising:
operating an indoor fan of the climate control system to rotate an impeller of the indoor fan in a reverse rotational direction opposite a nominal rotational direction of the impeller, wherein the indoor fan is configured to produce an airflow from an inlet to an outlet when the impeller is rotated in the nominal rotational direction and the direction of the airflow produced by the indoor fan does not reverse when the impeller of the indoor fan rotates in the reverse rotational direction;

determining an external static pressure (ESP) of the indoor fan when the impeller of the indoor fan is rotated in the reverse rotational direction, determining a duct leakage rate associated with at least one duct of the climate control system based on the determined ESP of the indoor fan, the at least one duct configured to route the airflow directly between the indoor fan and a conditioned space, wherein airflow through the at least one duct is restricted; and wherein determining the duct leakage rate is based on a determination that the determined ESP is less than a predetermined first threshold ESP, wherein determining the duct leakage rate further includes determining the duct leakage rate exceeds a predetermined maximum determinable duct leakage rate in response to a determination that the ESP is less than a second predetermined threshold ESP, wherein the second threshold ESP is less than the first threshold ESP.

9. The method of claim 8, further comprising:
determining the airflow of the indoor fan when the impeller of the indoor fan is rotated in the reverse rotational direction, and
wherein determining the duct leakage rate is based on a corrected airflow of the indoor fan in response to a determination that the determined ESP is less than a predetermined first threshold ESP.

10. The method of claim 9, wherein determining the airflow of the indoor fan includes determining the airflow from a measured speed and a measured torque of a fan motor of the indoor fan.

11. The method of claim 8, wherein:
the climate control system comprises a supply duct and a return duct, and the at least one duct is the supply duct sealed-off at an end thereof and airflow is permitted through the return duct; and
determining the duct leakage rate includes determining a duct leakage rate in the supply duct.

12. The method of claim 8, wherein:
the climate control system comprises a supply duct and a return duct, and the at least one duct is the return duct sealed-off at an end thereof and airflow is permitted through the supply duct; and
determining the duct leakage rate includes determining a duct leakage rate in the return duct.

13. The method of claim 8, the method further comprising:
issuing an alert to a user of the climate control system indicative of whether the duct leakage rate determined at (c) is greater than or less than a predetermined maximum permissible leakage rate.

14. The method of claim 8, wherein the first threshold ESP is between 0.08 inches of H20 (in H20d) and 0.12 in H20 and the second threshold ESP is between 0.02 in H20 and 0.07 in H20.

15. A climate control system for an indoor space, the climate control system comprising:
an indoor fan configured to produce an airflow through the indoor space;
at least one duct defining an air circulation path of the indoor space, the at least one duct configured to route the airflow directly between the indoor fan and a conditioned space, wherein airflow through the at least one duct is restricted;
a controller to be coupled to the indoor fan, wherein the controller is configured to:
operate the indoor fan to rotate an impeller of the indoor fan in a reverse rotational direction opposite a nominal rotational direction of the impeller, wherein the indoor fan is configured to produce an airflow from an inlet to an outlet when the impeller is rotated in the nominal rotational direction and the direction of the airflow produced by the indoor fan does not reverse when the impeller of the indoor fan rotates in the reverse rotational direction;

determine an external static pressure (ESP) of the indoor fan when the impeller of the indoor fan is rotated in the reverse rotational direction, determine a duct leakage rate associated with the at least one duct of the climate control system based on the determined ESP of the indoor fan, wherein determining the duct leakage rate is based on a determination that the determined ESP is less than a predetermined first threshold ESP, wherein the controller configured to determine the duct leakage rate is further configured to determine the duct leakage rate exceeds a predetermined maximum determinable duct leakage rate in response to a determination that the ESP is less than a second predetermined threshold ESP, wherein the second threshold ESP is less than the first threshold ESP.

16. The climate control system of claim 15, wherein the controller is further configured to:

determine the airflow of the indoor fan when the impeller of the indoor fan is rotated in the reverse rotational direction, and wherein the controller configured to determine the duct leakage rate is further configured to determine the duct leakage rate based on a corrected airflow of the indoor fan in response to a determination that the determined ESP is less than a predetermined first threshold ESP.

17. The climate control system of claim 16, wherein the controller is further configured to determine the airflow of the indoor fan is further configured to determine the airflow from a measured speed and a measured torque of a fan motor of the indoor fan.

18. The climate control system of claim 15, the climate control system comprises a supply duct and a return duct, and the at least one duct is the supply duct sealed-off at an end thereof and airflow is permitted through the return duct; and wherein the controller configured to determine the duct leakage rate is further configured to determine a duct leakage rate in the supply duct.

19. The climate control system of claim 15, the climate control system comprises a supply duct and a return duct, and the at least one duct is the return duct sealed-off at an end thereof and airflow is permitted through the supply duct; and wherein the controller configured to determine the duct leakage rate is further configured to determine a duct leakage rate in the return duct.

20. The climate control system of claim 15, wherein the first threshold ESP is between 0.08 inches of H20 (in H20) and 0.12 in H20 and the second threshold ESP is between 0.02 in H20 and 0.07 in H20.

* * * * *